United States Patent [19]

Tischler et al.

[11] Patent Number: 4,541,762
[45] Date of Patent: Sep. 17, 1985

[54] APPARATUS FOR LOADING AND/OR UNLOADING MACHINE TOOLS OR THE LIKE

[75] Inventors: Bernd Tischler, Heilbronn; Kurt Euerle, Neuenstadt-Cleversulzbach, both of Fed. Rep. of Germany

[73] Assignee: KK Automation Klaus Th. Kramer GmbH & Co., Fed. Rep. of Germany

[21] Appl. No.: 452,288

[22] Filed: Dec. 22, 1982

[30] Foreign Application Priority Data

Dec. 24, 1981 [DE] Fed. Rep. of Germany ....... 3151316

[51] Int. Cl.⁴ .............................................. B65G 60/00
[52] U.S. Cl. ....................................... 414/32; 414/120; 414/416
[58] Field of Search ................. 414/32, 120, 121, 413, 414/416

[56] References Cited

U.S. PATENT DOCUMENTS

| 2,467,203 | 4/1949 | Gelbman | 414/101 X |
| 3,421,638 | 1/1969 | Locke et al. | 414/32 |
| 3,429,466 | 2/1969 | Puderbach | 414/32 X |
| 3,517,831 | 6/1970 | Hahn | 414/71 X |
| 3,802,151 | 4/1974 | Baker | 414/416 X |
| 4,302,142 | 11/1981 | Kuhl et al. | 414/120 |
| 4,362,454 | 12/1982 | Kripzak | 414/416 X |

*Primary Examiner*—Leslie J. Paperner
*Attorney, Agent, or Firm*—Kane, Dalsimer, Kane, Sullivan and Kurucz

[57] ABSTRACT

A device for loading and/or unloading machine tools, conveyor belts and the like, with blanks or finished components, comprises a workpiece store or magazine (1) consisting of a stack (2) of pallets (3) positioned loosely one on top of another and each having receptacles for workpieces. A transporter (5) takes pallets one after the other from the stack and transports them to an unloading and/or loading station (a) to which the pallets are shifted in timed sequence, and the workpieces are removed by a sequence-timed loading and/or unloading device (7), fed to a machine tool or suchlike, and returned again after machining has taken place. After it has been worked through each pallet is then deposited at a receiving station (11) by the transporter.

3 Claims, 7 Drawing Figures

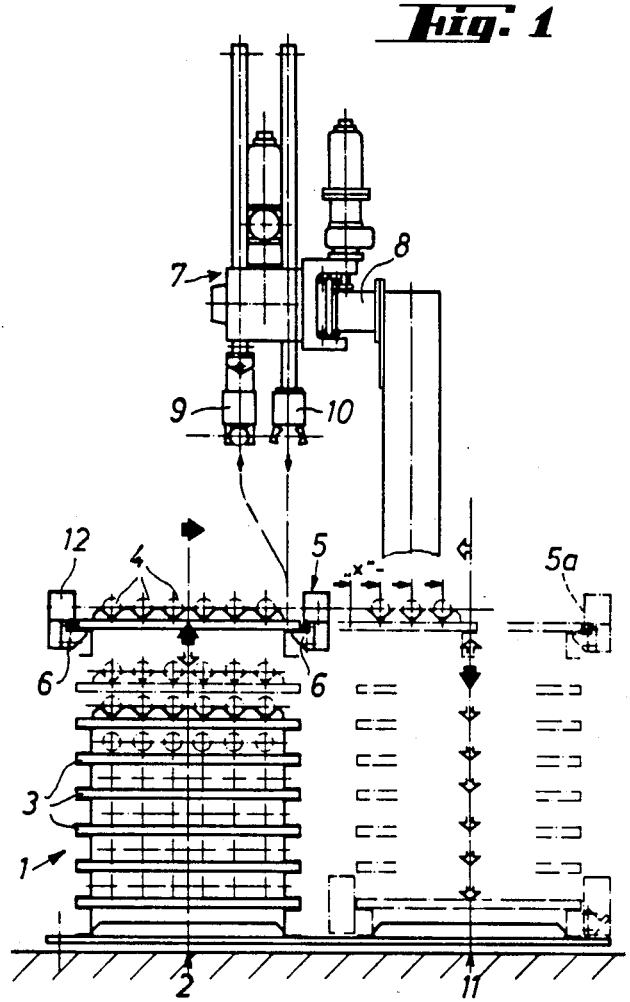

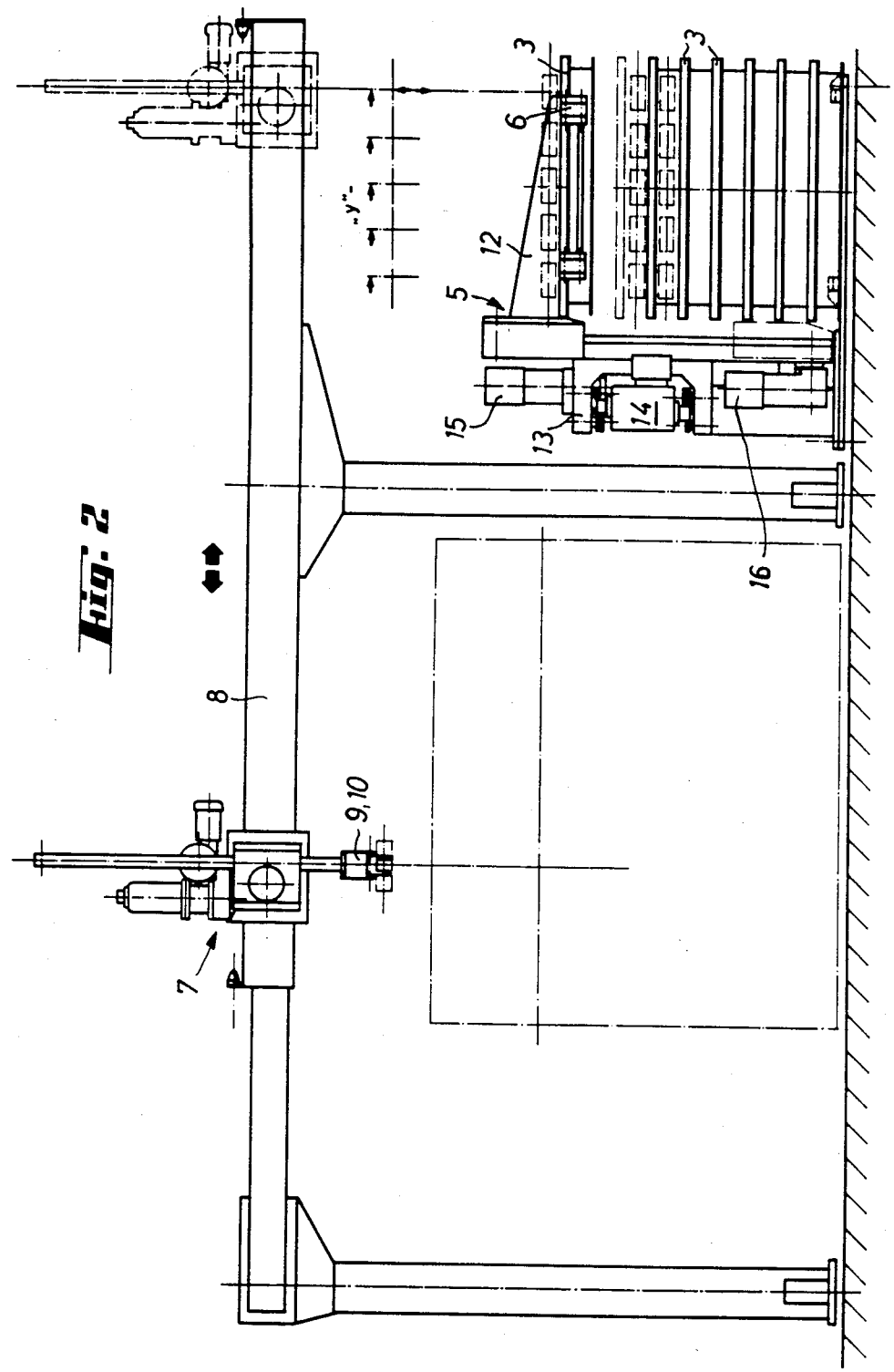

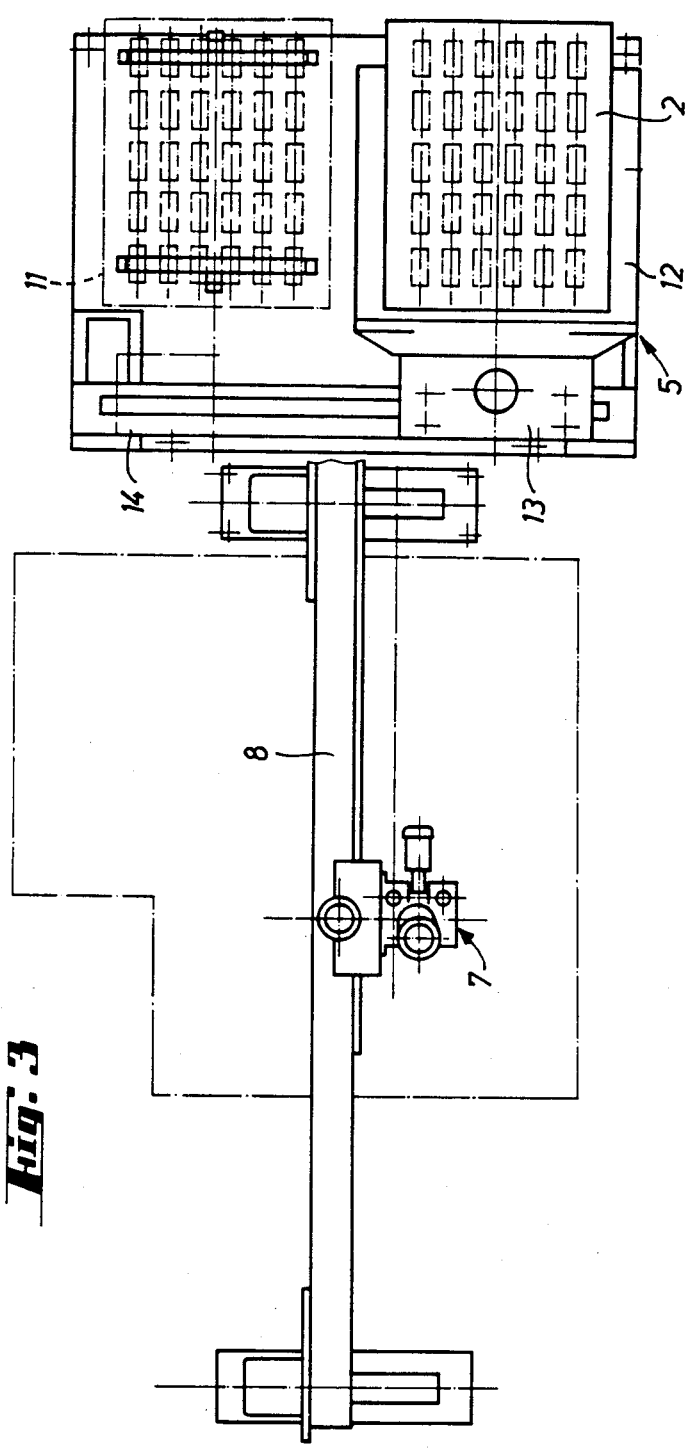

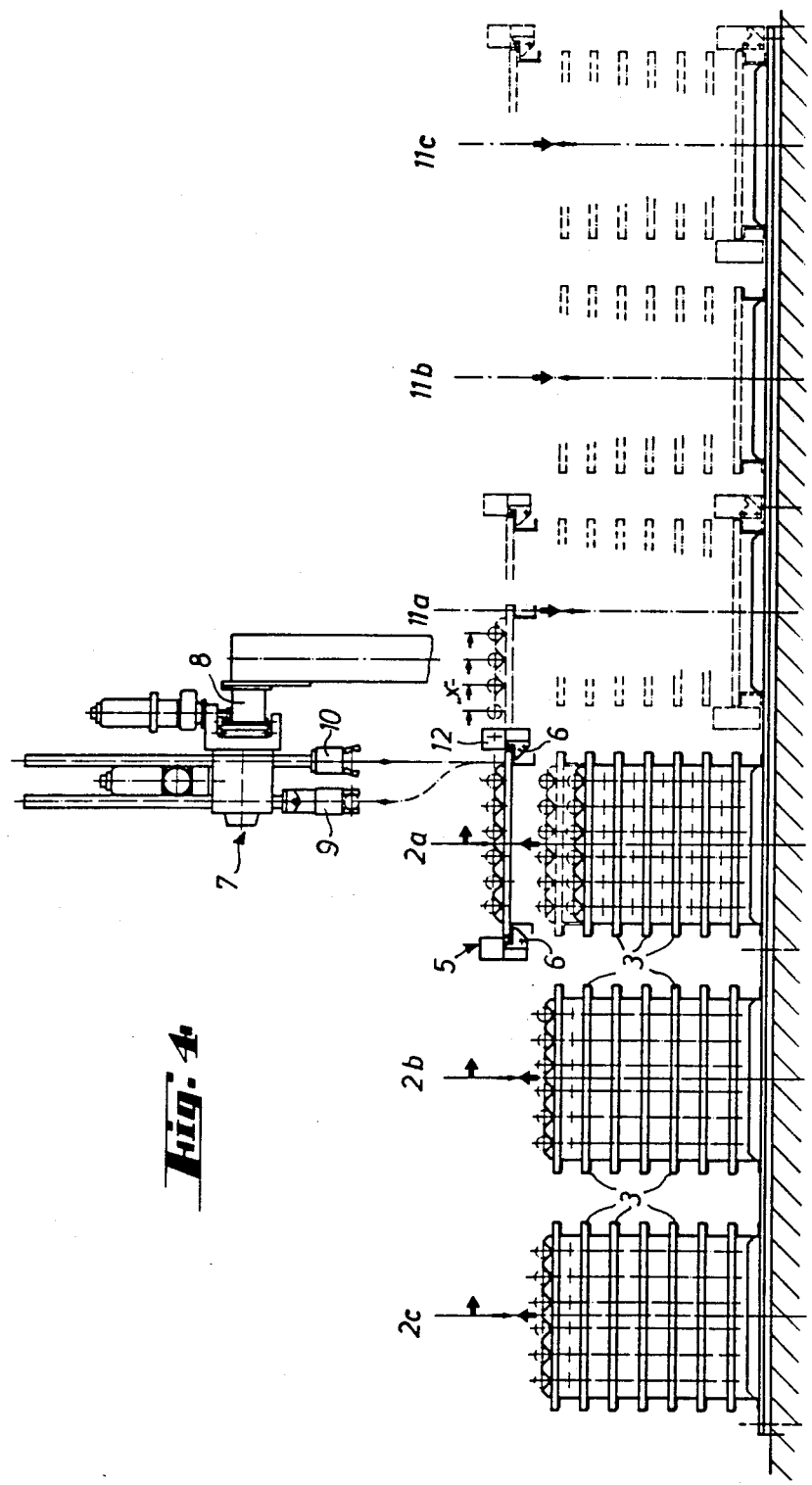

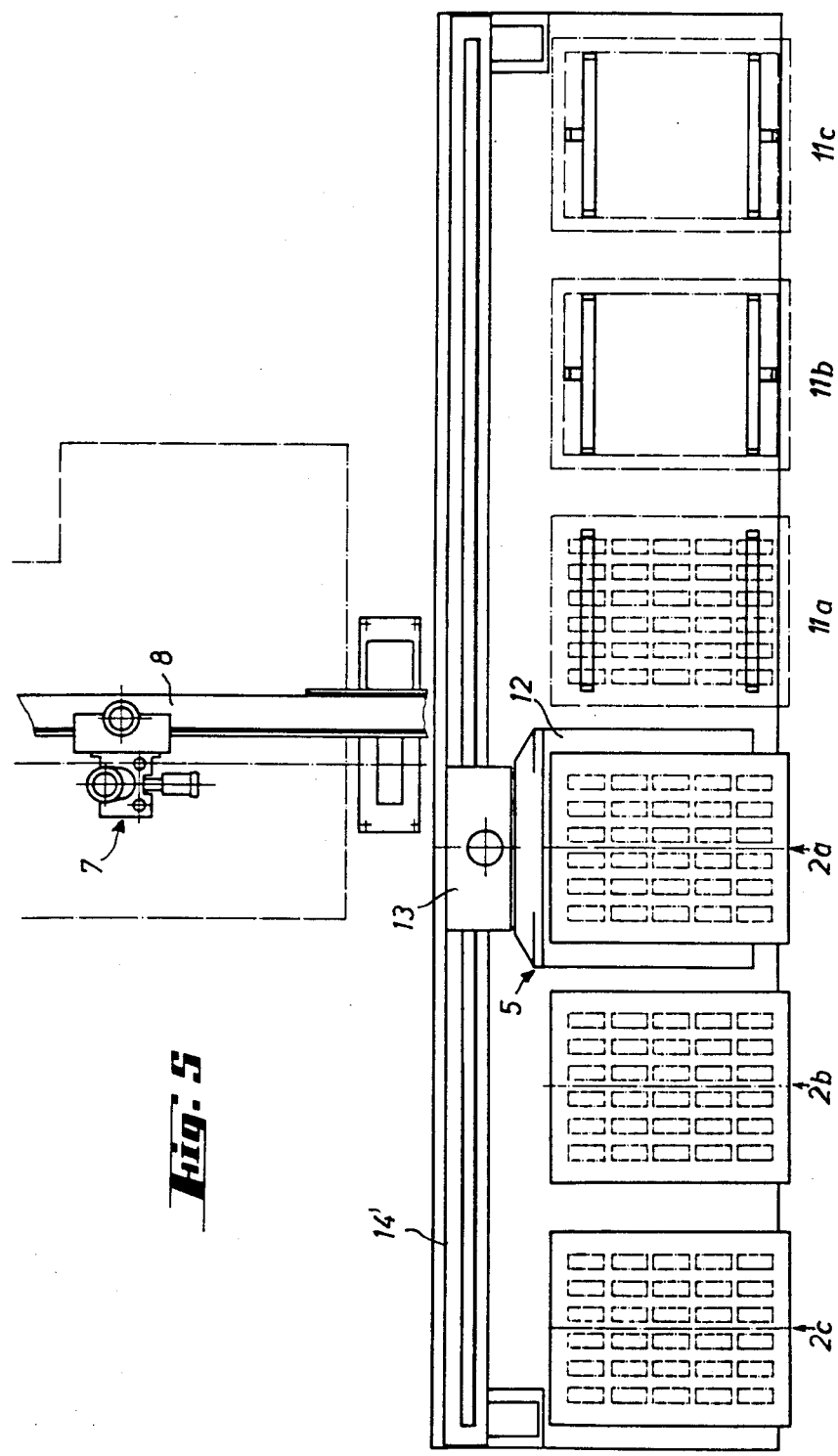

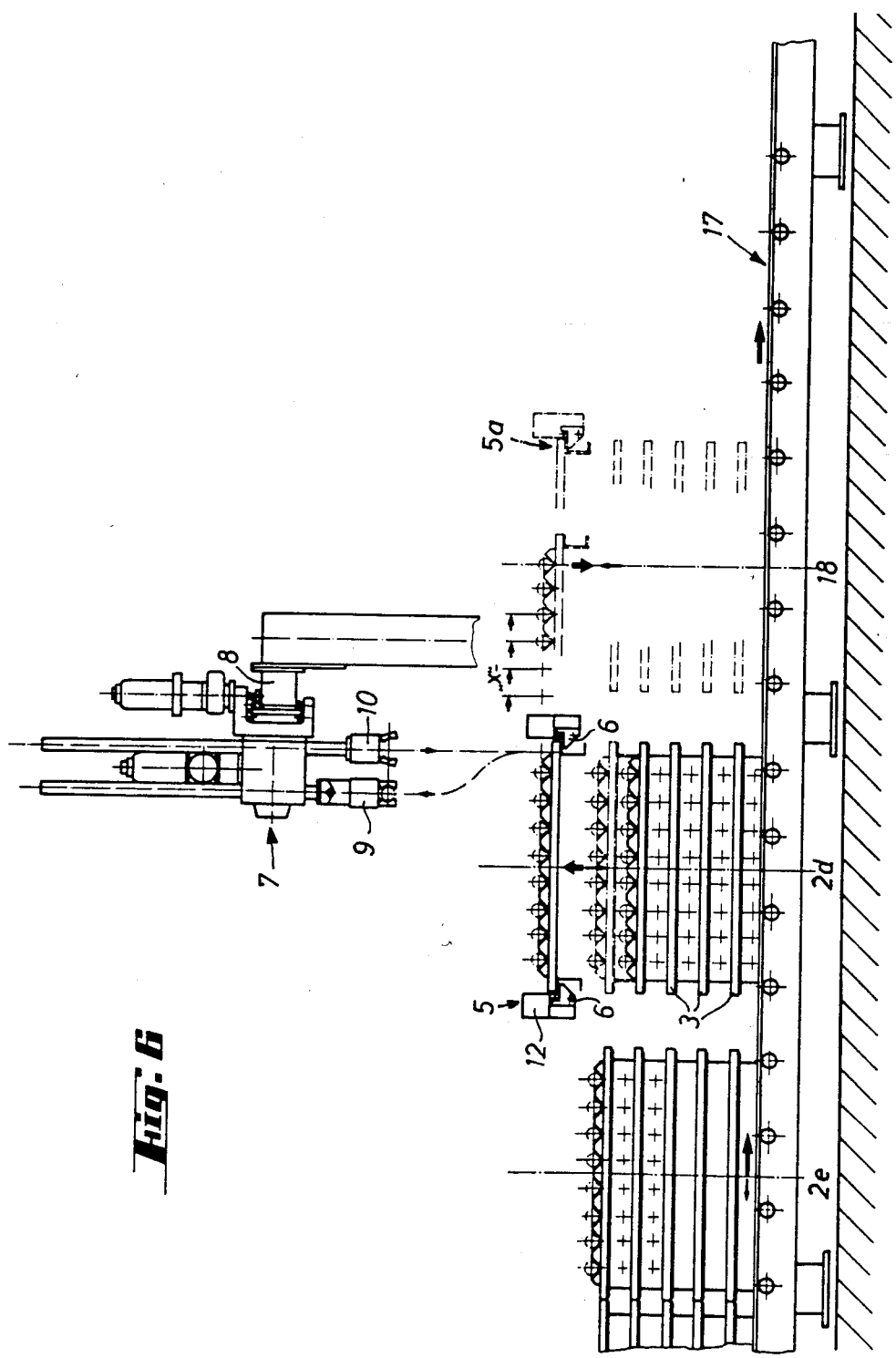

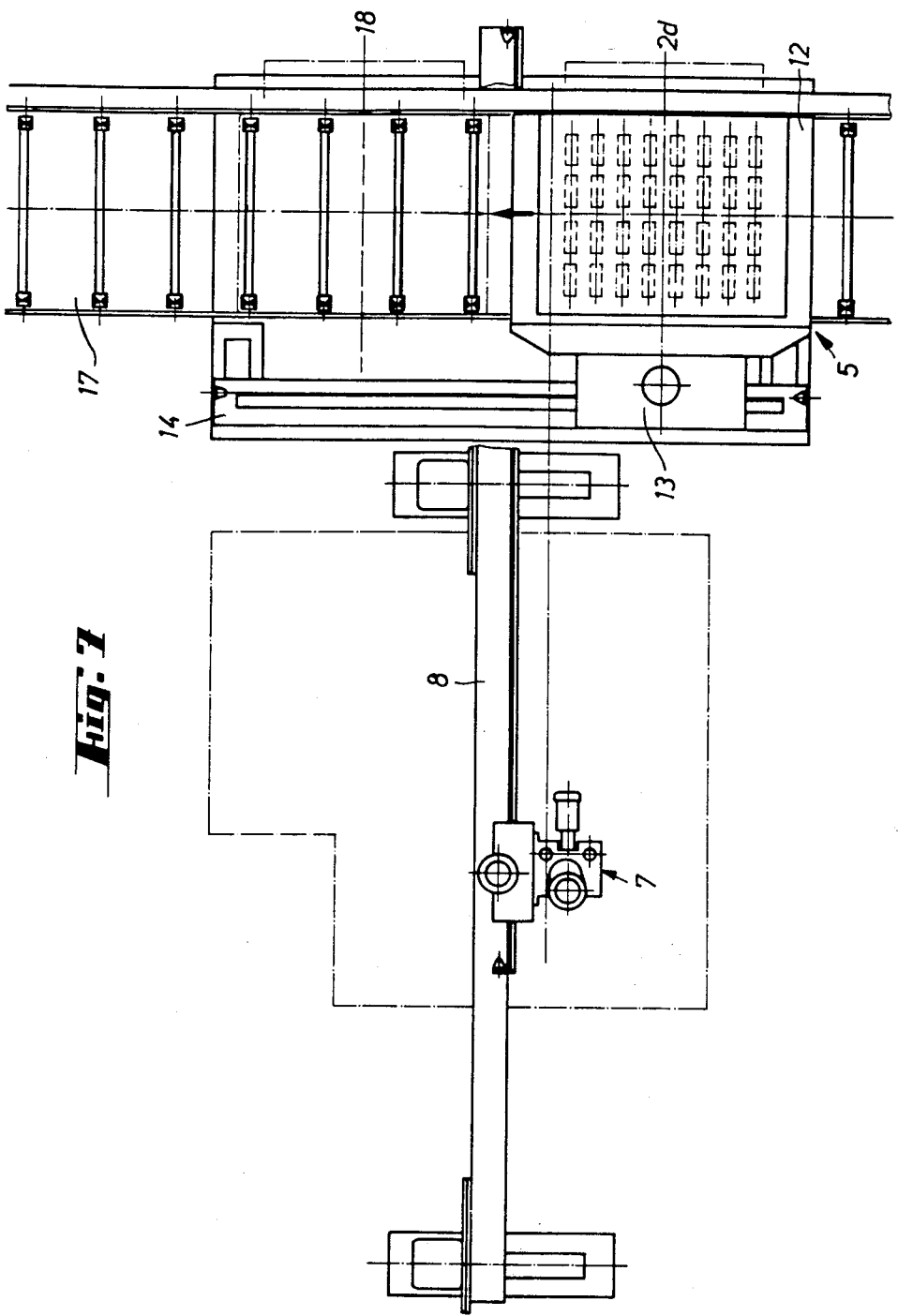

APPARATUS FOR LOADING AND/OR UNLOADING MACHINE TOOLS OR THE LIKE

This invention relates to a device for loading and/or unloading machine tools, conveyer belts and the like with blanks or finished components.

In the course of increasing automation, it has proved to be necessary also to automate and simplify as far as possible the loading and/or unloading of machine tools, conveyor belts and suchlike. It has been proposed to provide a workpiece store with several stages arranged one above the other, each provided with workpiece receptacles consisting of drawers in guides, which can be withdrawn singly from the store, lifted up to an unloading and loading station, moved in a timed cyclic sequence at the latter, lowered to their original level and shifted back into the store. Although this system, by comparison with other known handling systems, does have considerable advantages with regard to automatic loading and unloading of machine tools and requires only very short workpiece change times, it has certain limitations. In particular it is not capable in practice of universal application, especially as regards workpieces of very varying dimensions, since the drawers and the frame which accepts them impede freedom of movement, and have to be manufactured and kept available expressly for each individual instance of use.

An object of the invention is to provide a loading device of the type referred to which is capable of more universal use, and may for example allow workpieces of different dimensions to be handled.

Broadly stated the invention provides apparatus for loading and/or unloading machine tools, conveyor belts and the like with blanks or finished components, including a workpiece store comprising a stack of pallets loosely positioned one on top of another and each having receptacles for workpieces, a transporter for picking up the pallets one after the other from the stack, shifting them in timed sequence to a loading and/or unloading station and also for depositing the worked through pallets at a collecting station, and a loading and/or unloading device operating in a timed sequence, for removing workpieces from the pallet which is at the unloading and/or loading station, or for depositing workpieces on this pallet.

In a practical preferred form of the invention the store consists of normal commercial pallets provided with receptacles for the workpieces, and stacked loosely one on top of the other. The receptacles may comprise inserts which are matched to the profiles of the respective workpieces. By omitting the frame and drawers to be inserted into the frame, any number of pallets whose height is dependent upon the dimensions of the workpieces can be stacked one on top of the other, according to the space which is available. By adopting the correct work sequence continuous operation can be obtained involving the lifting of the pallets from the stack up to the loading and/or unloading station, proper timing of the pallets at this station with simultaneous removal of the workpieces from and/or return to the pallets and finally depositing the worked-through pallets at a receiving station. When a machine tool is to be loaded, the stack of pallets to be worked through contains blanks which are removed in succession from each pallet at the unloading station and fed to the machine tool. The finished components can either be returned the same pallet or fed to another place, for example, to another machine tool. The empty pallet or the pallet which is loaded with finished components is then moved to the receiving station.

Each stack of pallets is preferably worked through from top to bottom, where a light interrupting control system for the conveyor device can be provided in order to allow for pallets of different height, and this may be actuated by the individual pallets.

The stack of pallets may also consist of empty pallets if, for example, it is only finished components from a machine tool which are to be discharged, or if blanks or finished components have to be deposited on pallets by a conveyor belt.

When the stack of pallets has been worked through, i.e. when all the pallets of the stack have been moved by the transporter to the collecting station, and have run through the unloading and/or loading station, the place where the conveyor device picks up the pallets and conveys them to the unloading and/or loading station will be empty. A new stack of pallets, which may consist of pallets with blanks or even empty pallets, can then be moved to the loading station. This can most easily be carried out by a fork lift truck, but there may be provided also a conveyor belt on which the stacks of pallets are fed in succession to the loading station of the transporter and by means of which the worked-through stacks of pallets are simultaneously conveyed away. Since after one stack of pallets has been worked through, there is always a clear space between one stack of pallets worked through and the stack of pallets following, which is still to be worked through, a continuous sequence of operations can be achieved.

Alternatively, the workpiece store may have several stacks of pallets arranged in a row, in which case a number of loading stations corresponding to the number of stacks is provided. In this case, the transporter may be moved along the row of stacks and along the series of loading stations and arranged to bring the pallets of the individual stacks in succession to the unloading and/or loading station and then to the receiving station, so that the stacks are worked through one after the other.

Some embodiments of the invention will now be described by way of example with reference to the accompanying drawings in which:

FIG. 1 is a diagrammatic front elevation of a first example of the invention,

FIG. 2 is a side elevation of the device of FIG. 1 seen in the direction of the arrow A in FIG. 1, FIG. 3 is a top plan view of the device of FIG. 1, FIG. 4 is a view similar to FIG. 1 of a second example of the invention, FIG. 5 is a top plan view of the device of FIG. 4, FIG. 6 is a view similiar to FIG. 1 of a third example, and FIG. 7 is a top plan view of the device of FIG. 6.

Referring first to the example of FIGS. 1 to 3, it will be seen that the device there illustrated includes a workpiece store 1, which comprises a stack 2 of pallets piled loosely on top of each other. The pallets 3 are provided with inserts for accepting blanks 4. A transporter 5, which can be moved vertically and horizontally, has swivelling hooks 6, with which the transporter can pick up the pallets 3 off the stack 2 and transport them in succession to an unloading and loading station, a. At this loading and unloading station a the transporter 5 can be moved in timed sequence horizontally and to the right in FIG. 1. This time sequence is denoted as time sequence "X". From the respective pallet 3 which is located in the transporter 5, the workpieces are removed individually by a loading and unloading device 7, fed to a machine tool and deposited on the pallet again after being machined. The loading and unloading device 7 is movable horizontally on a gantry 8, and is shifted in timed steps in the area of the pallet. These timed steps are denoted as time interval "Y" in FIG. 2. The loading device 7 is provided with two alternately operating grabs 9 and 10. When the pallet on the transporter 5 has been worked through the transporter is in the position 5a indicated by chain lines in FIG. 1. In this position the transporter is lowered and the worked-through pallet is deposited at a receiving station 11. The transporter now moves upwardly and to the left in FIG. 1, to the unloading and loading station a, and is lowered in order to pick up the next pallet 3 and bring it to the unloading and loading station a, whereupon the operation previously described is repeated. When all the pallets of a stack have been worked through, they are therefore at the receiving station 11, from which they are removed for example by means of a fork lift truck: while the last pallet is being worked-through a fresh stack of pallets can be brought into the position which the stack 2 previously occupied.

As can be seen particularly from FIG. 3, the transporter has a U shaped frame 12, which is mounted to be vertically movable on a carriage 13 which, in turn, can be moved on a horizontal rail 14 by means of an electric motor 15. The vertical movement of the frame 12 is produced by means of a further electric motor 16.

The apparatus of FIGS. 4 and 5 differs from that of FIGS. 1 to 3 essentially only through the fact that the workpiece store comprises several stacks of pallets 2a, 2b and 2c arranged in a row one beside the other and in line with this row there are a number of receiving stations 11a, 11b and 11c corresponding to the number of stacks. Here, the rail 14' extends over the entire length of the row of stacks, 2a to 2c and receiving stations 11a to 11c, as can be seen from FIG. 5. The working-through of the individual pallets occurs as already described in connection with FIGS. 1 to 3. Thus, to begin with, the pallets of the stack 2a are worked through and deposited at the receiving station 11a. Then the pallets of the next stack 2b are picked up, shifted to the unloading station and deposited at the receiving station 11b. Finally, the pallets of the third stack 2c are worked through and deposited at the receiving station 11c. Working-through always takes place at the same place. Obviously, the arrangement can be so contrived that after machining the pallets of the stack 2a are deposited at the receiving station 11c, the pallets of the stack 2b deposited at the receiving station 11b, and the pallets of the stack 2c deposited at the receiving station 11a.

In the embodiment of FIGS. 6 and 7, several stacks of pallets 2d and 2e are mounted one behind the other on a conveyor belt 17. The conveyor device 5 is similar to the conveyor device 5 of FIGS. 1 to 3, i.e. the rail extends only over two stacks of pallets. The pallet stack 2d is underneath the conveyor device 5 and the pallets of the stack are worked through in the way described in connection with FIGS. 1 to 3 and deposited on the conveyor belt 17 at the point 18, which corresponds to the receiving station 11 in FIG. 1. When the stack 2d has been worked through, and therefore all the pallets of this stack have been deposited one on another at the point 18, the conveyor belt is advanced by one step, so that the stack 2e now reaches the point at which the stack 2d was previously situated. As there is always a clear space between a stack of pallets which has been worked through and a fresh stack of pallets, the worked-through pallets of stack 2e can be deposited at the point 17 on the conveyor belt where the stack 2d was previously situated. Since the conveyor belt 17 can be advanced by one step whilst the last pallet of stack 2d is being worked through, only very short standstill periods are needed.

The apparatus in the illustrated embodiments have been described in connection with a machine tool, where the pallets of stacks 2 . . . 2e are loaded with blanks which are fed to the machine tool and are deposited again in the pallets as finished components. The apparatus can also be used in cases in which the finished components are not deposited in the same pallets but are fed to a further machine tool, so that there are empty pallets at the receiving stations. Conversely, the stacks of pallets 2 . . . 2e can also contain empty pallets, which are firstly loaded with finished components at the loading station a and are then conveyed to the receiving station. The devices illustrated can also be used in connection with the loading and unloading of a conveyor belt or of any other type of store or magazine.

We claim:

1. An apparatus for loading and unloading work pieces from a work piece store comprising:
    an unloading station for a stack of pallets loosely positioned one on top of the other and each pallet having means for accommodating the work pieces;
    a restacking station adjacent said unstacking station;
    a horizontal rail extending in first direction (X);
    a transporter for picking up the uppermost pallet from said stack, lifting it to a loading and/or unloading level, shifting it horizontally in incremental steps separated by idle periods in said first direction (X) to said restacking station and lowering it at the restacking station and settling it on a support or a previous pallet and comprising a carriage mounted for movement on said rail in the horizontal direction and a member with means for engaging said pallets and vertically movable on said carriage; and
    a loading and unloading member movable in timed sequence horizontally in a second direction (Y) which is perpendicular to said first direction (X) for removing or depositing workpieces from or on the pallet which is on said loading and/or unloading level during the idle periods.

2. The apparatus as claimed in claim 1 further comprising a conveyor belt common to both the unstacking and the restacking station for accepting a series of pallet stacks, and means for advancing said conveyor belt one step when the pallets of a stack have been transferred from the unstacking to the restacking station to bring a new stack of pallets to the unstacking station, and to clear the restacking station of the restacked stack.

3. The apparatus of claim 1 wherein said loading and unloading member comprises a gantry extending in the Y direction, a loading device movably disposed on said gantry and means attached to said loading device for selectively grabbing and releasing workpieces.

* * * * *